Patented July 2, 1946

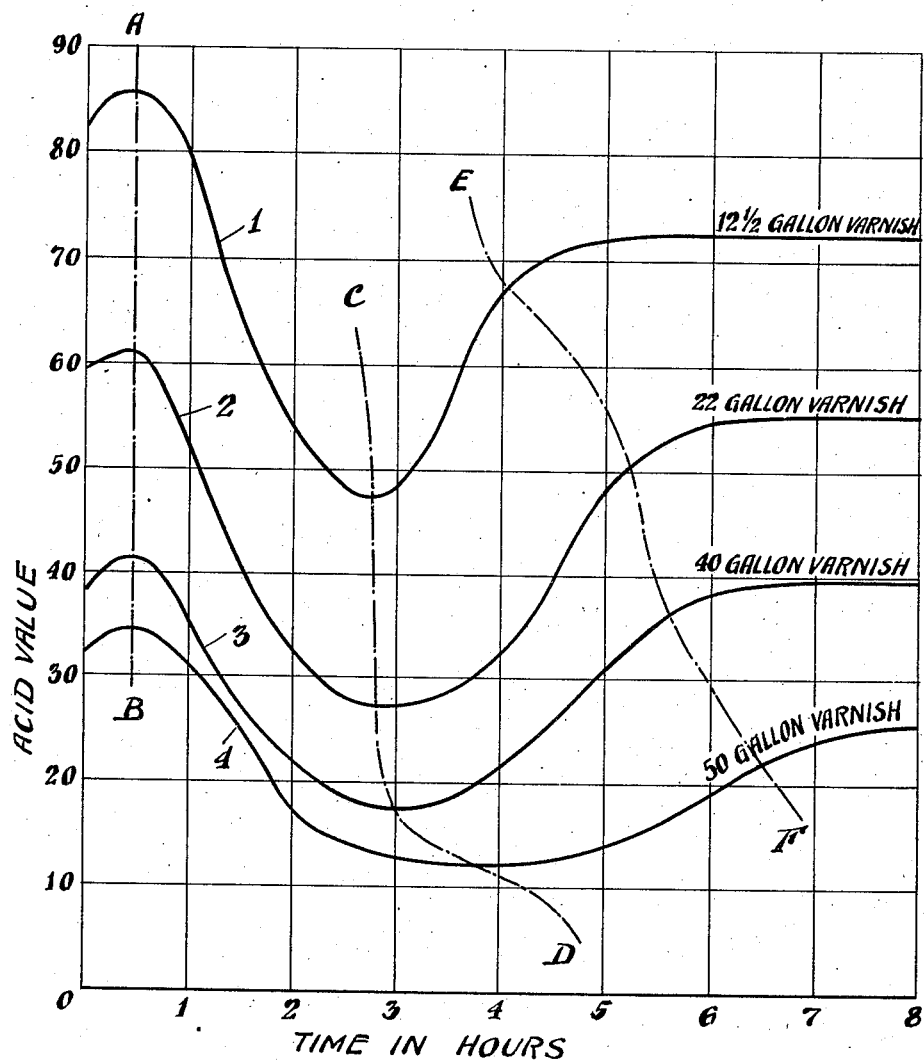

2,403,300

UNITED STATES PATENT OFFICE 2,403,300

PREPARATION OF VARNISH COMPOSITIONS

Alfred E. Rheineck and Samuel B. Crecelius, Louisville, Ky., assignors to Devoe & Raynolds Company, Inc., a corporation of New York Application July 28, 1942, Serial No. 452,660

15 Claims. (Cl. 260—104)

1

In the manufacture of varnishes, the classical method has been to heat together or "run" a natural resin with an oil such as linseed or tung oil. Hydroxyl bearing oils, especially castor oil, have been suggested for use in making varnishes, but these oils do not have proper drying qualities and before being used, must be subjected to a process of dehydration which is ordinarily carried on by the aid of catalysts or other reactants.

We have discovered that very fine varnishes can be made simply by heating together an acidic resin, such as rosin, and a hydroxylated oil, such as castor oil (or the oil acids) and carrying on the heating for a sufficient length of time at a proper temperature. Subsequently the acidity is removed by esterification with a polyhydric alcohol such as glycerine. The resulting product, surprisingly enough, has excellent drying qualities and in fact is better than most of the oleoresinous varnishes.

Castor oil is the most readily available hydroxylated oil, but the invention is applicable to other hydroxyl bearing oils or oil acids which may be synthetic bodies, such for example as dihydroxy stearic acid or its polyhydric alcohol esters, or hydroxylated natural oils.

Rosin is the most readily available acidic resin but other natural resins may be employed either in their normal state or in modified form provided they are acidic in their nature. Thus fossil resins may be used which have been heated or "run" to increase their acidity and solubility in oil. Various modified forms of rosin or other natural resins which may be used include the maleic anhydride adducts and the nonesterified rosin modified phenolic resins. In these cases the rosin still retains its acidic nature, and therefore is available for our process. An example of an acidic resin of a synthetic nature is licanic acid resin. These examples are given as illustrating what we mean by the term "acidic resins." In addition to the acidic resins, other nonacidic resins can be included either from the beginning of the operation or may be added subsequently, but they apparently do not take part in the reaction and therefore are only used in conjunction with acidic resins. The proportion of resin to oil may vary over wide limits, but ordinarily should fall within the range to give a varnish of useable oil length. Thus the composition may vary from 5 to 50-gallon oil length proportions.

In order to accomplish our result, the hydroxylated oil and the acidic resin must be heated above a temperature of about 270° C. and the

2 top limit is the practical temperature at which the oil will darken materially, say about 350° C. A good working temperature is between 290° C. and 325° C. and we prefer to operate at about 300° C.

The time of treatment will vary from about 3½ to 8 hours, depending upon the relative proportions of oil and resin. The long oil varnishes require a longer time. The oil and resin may be heated in simple mixture, preferably in a closed vessel provided with a stirrer. However, we find that the use of a small amount of inert solvent is of assistance as water is given off during the treatment and the solvent helps to remove the water. In practice the solvent is condensed, separated from the water and returned to the vessel.

When our process is carried out, if a study is made of the acid values of a mixture of rosin and a hydroxylated oil such as castor oil, interesting factors may be noted. As the temperature rises to about 270° C. the acid number rises quite rapidly, probably due to the evolution of volatile ingredients. This may occur, for example, during about the first half hour of heating. Thereafter for about 2 to 2½ hours (at a temperature of about 280° C. or higher, say about 300° C.) the acid number drops quite steadily and after reaching a minimum, it again rises appreciably and may even reach a figure approximately as high as the initial acid value. We know that the process is complete when the rate of rise of the acid number becomes very slight, which indicates that any reaction that may be taking place has been substantially completed. While approximately complete reaction is desirable, as indicated by the acid number reaching substantial equilibrium, still results of some value may be had short of this point. However, in any event the heating should be conducted at a temperature of between about 270° C. and 350° C. and should be continued until the acid number of the mass has risen substantially above its minimum value.

For the purpose of illustration, we show in the accompanying drawing curves for four different rosin-castor oil mixtures in which acid values are plotted against time of treatment. In all cases the oils were heated so that they reached a temperature of about 270° C. in just under half an hour and reached a temperature of about 300° C. in not over 1 hour and then were held at about that temperature.

In this drawing, the curve designated by the numeral 1 represents a 12½ gallon varnish, that is, a varnish made up of 12½ gallons of oil with 100 pounds of rosin. The curve marked 2 designates a 22-gallon varnish, that is 22 gallons of oil with 100 pounds of rosin. Curve marked 3 represents a 40-gallon varnish and the curve marked 4 represents a 50-gallon varnish.

It will be noted that all of these curves show an increase of acidity during approximately the first half hour as marked by the line AB. They then show a drop to a point of minimum acidity marked by the line CD and then show an increase until the acid value become substantially constant. We find that it is not necessary to carry the heating all the way to this point but something approximating this point, say to a point as indicated by the line EF, will ordinarily be sufficient. As indicated in the drawing, this took from about 4 to 6½ hours but with varying temperatures and different proportions of ingredients this may take from 3½ to 8 hours.

After this phase of the treatment has been carried to the point indicated, the acid number of the mixture is ascertained and a slight excess of polyhydric alcohol is added. We here use the term "polyhydric" alcohol as indicating an alcohol having more than two available hydroxyl groups. Thus we may employ glycerol, mannitol, sorbitol, erythritol, pentaerythritol and its poly ethers such as dipentaerythritol or polypentaerythritol, inositol or other similar alcohols. The esterification with this alcohol is carried out in known manner preferably at a temperature in the order of about 300° C. and the heating is continued even after esterification is completed until the oil in the varnish is sufficiently bodied. For example, we have found that excellent results are had if after the finished varnish is thinned to 50% solids with mineral spirits, it has a viscosity of about F on the Gardner-Holdt scale. As the oil length increases, care must be exercised during the last reaction to avoid gelation before esterification is completed. This is usually accomplished by using the lower esterification temperatures and gradually raising the temperature as reaction becomes complete. Ordinarily additional heating to gain body is unnecessary. Various aids to esterification may be employed such as the use of small amounts of inert solvents or blowing an inert gas such as carbon dioxide through the mass, or even esterification catalysts.

The foregoing description covers the essential features of our invention but obviously various modifications may be employed. Thus in place of castor oil, we may employ castor oil acids which are subsequently esterified with polyhydric alcohol. Also instead of using a natural hydroxylated oil such as castor oil, synthetic hydroxyl bearing oils may be employed, such for example as dihydroxy stearic acid or ester of this acid. It is also possible after the primary treatment of the hydroxylated oil (or oil acids) has been carried out, to add additional resinous ingredients or additional oils. Thus the oil length of the varnish may be reduced by adding natural resins or synthetic resin such as phenolic resins and the oil length may be lengthened by adding other oil such as linseed oil or the like. Hydroxylated oils may also be prepared by treating natural oils with oxidizing agents.

Detailed methods of carrying out our invention can readily be understood from the following illustrative examples:

EXAMPLE I

The following example illustrates the preparation of a 12-gallon varnish made from castor oil and rosin.

FIRST STEP

| | Parts |
|---|---|
| Castor oil | 500 |
| Rosin (WG) | 447 |
| "Solvesso #2" | 40 |

The mixture was heated with refluxing and stirring for 6 hours at 300° C. The final acid value was 77. "Solvesso #2" referred to in this and certain of the following examples is an aromatic petroleum naphtha having a boiling point range of about 275° F. to 345° F.

SECOND STEP

Esterification

| | Parts |
|---|---|
| Product of first step | 500 |
| Pentaerythritol | 23.4 |

The mixture was heated for 7 hours at 240° C. The final varnish had the following constants:

| | |
|---|---|
| Acid value | 8 |
| Vis. (50% solids) | B |

This varnish dried to a hard film in 2 hours. This varnish and those which follow contained .5% Pb and .04% Co as driers unless otherwise indicated.

EXAMPLE II

The following example illustrates the preparation of a 22 gallon varnish by lengthening the product of the first step in Example I.

| | Parts |
|---|---|
| Product (first step Ex. I) | 600 |
| Pentaerythritol | 23.4 |
| Bodied linseed oil (viz. Z₃) | 250 |

The mixture was heated 6 hours at 240° C. The final varnish had the following constants:

| | |
|---|---|
| Acid value | 8.9 |
| Viscosity | F |

This varnish dried to a good film in 4 hours which was better than the standard made by other methods.

EXAMPLE III

The following example illustrates the preparation of a 19 gallon varnish made from a product approximately as indicated in the first step of Example I.

| | Parts |
|---|---|
| Product (first step Ex. I—Av.=72.3) | 500 |
| Bodied linseed oil | 200 |
| Phenolic base (dry) | 43 |
| Glycerol | 19 |

The phenolic base for this example was made by heating the following for 2 hours.

| | Parts |
|---|---|
| p-Tertiary butyl phenol | 450 |
| Formaldehyde (solution 37%) | 500 |
| Sodium hydroxide | 2 |

The mixture was heated with gentle refluxing and agitation 8 hours starting 250° C. and gaining 290° C. in 2 hours, and holding here for the remaining 6 hours.

The final varnish had the following constants:

| | |
|---|---|
| Acid value | 5 |
| Viscosity | C |

This varnish dried to a good film in 4 hours which was better than the standard made by other methods.

EXAMPLE IV

The following example illustrates the preparation of a 21 gallon varnish made from castor oil and rosin.

FIRST STEP

| | Parts |
|---|---|
| Castor oil | 1,500 |
| Rosin | 800 |
| "Solvesso #2" | 40 |

The mixture was heated for 6½ hours at 300° C. The final acid value was 55 when 75 parts of water were evolved.

SECOND STEP

| | Parts |
|---|---|
| Product from first step | 1,097 |
| Mannitol | 52 |
| Mineral spirits | 20 |

The mixture was heated for 14 hours at 240° C. The final varnish had the following constants:

Acid value _____ 5.5
Viscosity _____ F-G

The varnish dried to a good film in 3 hours.

EXAMPLE V

The following example illustrates the preparation of a 40-gallon varnish made by heating castor oil with rosin.

FIRST STEP

| | Parts |
|---|---|
| Castor oil | 1,500 |
| Rosin | 447 |
| "Solvesso #2" | 40 |

This mixture was heated for 7 hours at 300° C. The final product had an acid value of 39.7 and 74 parts of water were evolved.

SECOND STEP

| | Parts |
|---|---|
| Product from first step | 800 |
| Glycerol | 19 |
| Mineral spirits | 40 |

This mixture was heated for 3 hours between 270° C. and 300° C., gaining 300° C. during this period. The final varnish had the following constants:

Acid value _____ 4.8
Viscosity _____ Q

This varnish dried to a good film in 5 hours.

EXAMPLE VI

The following example illustrates the preparation of a 50-gallon varnish made by heating castor oil with rosin.

FIRST STEP

| | Parts |
|---|---|
| Castor oil | 1,500 |
| Rosin | 325 |

This mixture was heated for 9 hours at 300° C. The final product had an acid value of 33, and 75 parts of water were evolved.

SECOND STEP

| | Parts |
|---|---|
| Product from first step | 450 |
| Dipentaerythritol | 12.7 |

The mixture was esterified for 90 minutes at 225° C. with stirring and passage of carbon dioxide.

This was thinned to 50% solids with equal parts xylene and mineral spirits.
The varnish had the following constants:

Viscosity _____ H
Acid value _____ 7.6

This dried to a good film in 24 hours when treated with .5% of Pb and .03% Co as driers.

EXAMPLE VII

The following example illustrates the preparation of a 22-gallon varnish made by heating castor oil and a "run" congo resin.

FIRST STEP

| | Parts |
|---|---|
| Castor oil | 1,500 |
| Run congo resin | 805 |
| "Solvesso #2" | 30 |

This mixture was heated to 300° C. for 7 hours. The final acid value of the mixture was 25 and 72 parts of water were evolved.

SECOND STEP

| | Parts |
|---|---|
| Product from first step | 800 |
| Pentaerythritol | 17 |
| Mineral spirits | 40 |

This mixture was heated for 4 hours at 235° C. The final varnish had the following constants:

Acid value _____ 8
Viscosity _____ H

EXAMPLE VIII

The following example illustrates the preparation of a 40-gallon varnish made from castor oil, fatty acids and rosin.

FIRST STEP

| | Parts |
|---|---|
| Castor oil fatty acids | 1,435 |
| Rosin | 447 |
| "Solvesso #2" | 30 |

This mixture was heated for 5 hours at 300° C. The final acid value was 155.

SECOND STEP

| | Parts |
|---|---|
| Products from first step | 800 |
| Glycerol | 71 |
| Mineral spirits | 40 |

The mixture was heated 7½ hours as 235° C. The final varnish had the following constants:

Acid value _____ 5.5
Viscosity _____ E

This varnish dried to a good film in 5 hours.

EXAMPLE IX

The following example illustrates the preparation of a 20-gallon varnish from hydroxylated oleic acid (9-10 dihydroxy stearic acid) and rosin.

FIRST STEP

The 9-10 dihydroxy stearic acid was prepared as follows:

| | Parts |
|---|---|
| Oleic acid | 168 |
| Potassium permanganate | 168 |
| Potassium hydroxide | 50 |
| Water | 5,000 |
| Sulphur dioxide | |

The oleic acid and base were reacted in 1,000 parts of water, and the permanganate was dissolved in 3,000 parts of water. The soap solution was cooled to below 5° C. and the permanganate solution added. The rate of addition of the permanganate was such that the temperature did not rise above 5° C. The remaining water was added as ice. This required about 3 hours under constant agitation. Sulphur dioxide was passed into the mass until the mass became a pure white. The solids were coagulated by gentle heating, freed of the excess liquid and washed several times with hot water. The hard mass was dispersed in petroleum ether, and gently heated and filtered. This solid remaining was the 9-10 dihydroxy stearic acid.

SECOND STEP

| | Parts |
|---|---|
| Dihydroxystearic acid | 160 |
| Rosin | 89 |

This mixture was heated for about 7 hours, gaining 300° C. in 1½ hours, and holding. Practically theoretical water was recovered. The mass was cooled and dissolved in petroleum ether and filtered. (This removed an oxy-type acid which is a by-product of this reaction.) The final petroleum ether bearing solution had an acid value of 147.

THIRD STEP

| | Parts |
|---|---|
| Product from second step | 178 |
| Glycerol | 15 |

This mixture was heated together for 8 hours at 260° to 270° C. The final acid value was 10, and viscosity was A at 75% solids. This dried to a dry film in 24 hours.

EXAMPLE X

The following example illustrates the preparation of about a 25-gallon varnish from hydroxylated triolein and rosin.

FIRST STEP

The hydroxylated triolein was prepared as follows:

| | Parts |
|---|---|
| Triolein | 435 |
| Acetic acid—glacial | 275 |
| Hydrogen peroxide—30% | 1,500 |

This mixture was gently heated for 2 hours when the solution became homogeneous. It was further heated with gentle refluxing for 2 more hours. Upon cooling, the mass was washed with several portions of salt water. The oily mass was extracted with several portions of petroleum ether. The heavy oil was then freed of any dissolved petroleum ether.

SECOND STEP

| | Parts |
|---|---|
| Hydroxylated triolein | 365 |
| Rosin | 182 |
| "Solvesso #3" (boiling point 345° F. to 410° F.) | 5 |

This mixture was refluxed for 2 hours at 250° C. and then heated to 300° C. and held for 6 hours, until the acid value remained constant at 39.8.

THIRD STEP

| | Parts |
|---|---|
| Product of second step | 425 |
| Glycerol | 9.5 |

This mixture was heated together with stirring for 6 hours at 275° C. The final acid value was 2.7.

This dried to a good film in 24 hours.

EXAMPLE XI

The following example illustrates the preparation of a varnish made from hydroxylated soya bean oil and rosin.

FIRST STEP

Following the method of Example X, first step, the following were used to prepare hydroxylated soya bean oil:

| | Parts |
|---|---|
| Soya bean oil | 435 |
| Acetic acid—glac | 420 |
| Hydrogen peroxide (30%) | 2,000 |

SECOND STEP

| | Parts |
|---|---|
| Hydroxylated soya bean oil | 415 |
| Rosin | 208 |
| "Solvesso #3" | 70 |

This mixture was heated to 300° C. in about an hour and held at this temperature for 8 hours, when the acid value remained constant at 56.

THIRD STEP

| | Parts |
|---|---|
| Product of second step | 480 |
| Glycerol | 15 |

This mixture was heated, together with stirring and passage of inert gas, for 7 hours at 275° C. The final acid value was 5. This dried to a good film in 24 hours.

EXAMPLE XII

The following example illustrates the preparation of a 20-gallon varnish made from castor oil and an unesterified modified phenolic resin.

FIRST STEP

| | Parts |
|---|---|
| Castor oil | 1,500 |
| Unesterified modified phenolic resin | 890 |
| "Solvesso #2" | 70 |

(The resin used in this example is known as "Arochem 385." It is rosin combined with about 15% of a phenolic base.)

The resin and oil were heated together with refluxing for 7 hours at 300° C. The final acid value was 41.4 and 75 parts of water were evolved.

SECOND STEP

| | Parts |
|---|---|
| Product (first step) | 800 |
| Pentaerythritol | 22 |

The mixture was heated together with stirring and passage of inert gas at 225° C. for 4 hours. This was thinned to 50% solids with equal parts of mineral spirits and xylene.

The final varnish had the following constants:

| | |
|---|---|
| Acid value | 12 |
| Viscosity | G |

This dried to a good film in 10 hours with .5% Pb and .03% Co. as driers.

EXAMPLE XIII

This example illustrates the preparation of a 22-gallon varnish made from castor oil and a maleic anhydride rosin resin.

FIRST STEP

| | Parts |
|---|---|
| Castor oil | 1,500 |
| Maleic rosin resin | 711 |
| "Solvesso #2" | 40 |

(The resin used in this example was made by reacting 1500 parts of rosin with 170 parts of maleic anhydride at 200° C. to 210° C. for 30 minutes.)

The resin and oil were heated together with refluxing for 7 hours at 300° C. The final acid value was 55.4. The theoretical water was evolved.

SECOND STEP

| | Parts |
|---|---|
| Product (first step) | 660 |
| Glycerol (98%) | 22 |

This was heated with stirring and passage of inert gas for 7 hours at 240° C. This was thinned to 50% solids with mineral spirits. The final varnish had the following constants:

| | |
|---|---|
| Viscosity | T |
| Acid value | 10.3 |

When treated with .5% of Pb and .03% of Co as driers, this varnish dried to a good film in 10 hours.

EXAMPLE XIV

This example illustrates the preparation of a 5-gallon varnish made from castor oil and the resin of Example XIII.

FIRST STEP

| | Parts |
|---|---|
| Castor oil | 300 |
| Resin (Example XIII) | 715 |
| "Solvesso #2" | 40 |

This mixture was heated to 300° C. for 3½ hours when the final acid value was 113.1. The theoretical water was evolved.

SECOND STEP

| | Parts |
|---|---|
| Product (first step) | 800 |
| Glycerol (98%) | 53 |

This mixture was heated to 230° C. for 8 hours with stirring and passage of inert gas. The varnish solids were thinned to 50% solids with mineral spirits. The final varnish had the following constants:

| | |
|---|---|
| Acid value | 9.4 |
| Viscosity | D |

In this case we use the term "oily oil-acid compound" as specifically covering the acids of natural, animal or vegetable oils, or their polyhydric alcohol esters, thereby including the oils themselves. The term "oily" is intended to describe the material when in the liquid phase. Thus the term "oily hydroxylated oil-acid compound" is intended to be generic to materials such as ricinoleic acid or dihydroxy stearic acid or the like or their esters such as castor oil or other hydroxylated natural oils, and also to synthetic polyhydric alcohol esters of these acids. Certain of these bodies are solid at normal temperatures but when brought into the liquid phase they may properly be described as "oily."

What we claim is:

1. A process for making useful varnish bodies which comprises the steps of heating together castor oil and rosin at a temperature of between 290° C. and 325° C. and under conditions such that the rosin will react with the castor oil and continuing the heating for more than 3½ hours and until the acid number of the mass has risen substantially above its minimum value and until the rate of rise of the acid number is very slight, and subsequently esterifying with a polyhydric alcohol.

2. A process as specified in claim 1 in which the mass is esterified with glycerine.

3. In the process of making useful varnish bodies the step which consists in heating a substance selected from the group consisting of the hydroxylated natural oils and the hydroxylated fatty acids of such oils with a resin of acid reaction having free carboxyl groups adapted to combine with the hydroxyl groups of such first selected substance at a temperature of between 270° C. and 350° C. and under conditions under which the resin will react with such first selected substance, and continuing the heating for more than 3½ hours and until the acid number of the mass has risen substantially above its minimum value.

4. In the process of making useful varnish bodies the steps which consist in reacting a substance selected from the group consisting of the hydroxylated natural oils and the hydroxylated fatty acids of such oils with a resin of acid reaction having free carboxyl groups adapted to combine with the hydroxyl groups of such first selected substance at a temperature of between 270° C. and 350° C., continuing the heating for more than 3½ hours and until the acid number of the mass has risen substantially above its minimum value and then esterifying with a polyhydric alcohol.

5. A process as specified in claim 4 in which the temperature of the first step reaches a point between 290° C. and 325° C. and the heating is continued until the acid number becomes approximately constant.

6. A process as specified in claim 4 in which the resin used is rosin.

7. A process as specified in claim 4 in which the resin used is resin reacted with maleic anhydride.

8. A process as specified in claim 4 in which the first substance selected is castor oil and the resin is rosin reacted with maleic anhydride.

9. An intermediate varnish compound consisting of the reaction products of a substance selected from the group consisting of the hydroxylated natural oils and the hydroxylated fatty acids of such oils reacted with a resin of acid reaction having free carboxylic groups adapted to combine with the hydroxyl groups of such first selected substance and heated at a temperature between 270° C. and 350° C. for more than 3½ hours and until an approximate equilibrium of acid value is reached, the ingredients being present in proportions equivalent to between 5 and 50 gallons of oil per 100 pounds of resin.

10. A varnish body consisting of the esterified reaction products of a substance selected from the group consisting of the hydroxylated natural oils and the hydroxylated fatty acids of such oils, reacted at a temperature of between 270° C. and 350° C. with a resin of acid reaction having free carboxyl groups adapted to combine with the hydroxyl groups of such first selected substance in proportions equivalent to between 5 and 50 gallons of oil per 100 pounds of resin and heated for more than 3½ hours and until a point of substantial equilibrium of acid value is reached, and subsequently esterified with a polyhydric alcohol, such body being characterized by its excellent drying qualities and low acid number.

11. A body as specified in claim 10 consisting of the esterified reaction product of castor oil and a resin comprising rosin.

12. The process of making a varnish comprising heating castor oil and rosin in the absence of polyhydric alcohol at 290-325° C. for more than 3½ hours and until the acid value passes through a minimum value and rises to a maximum approximately the same as the original acid value, and subsequently esterifying the resulting mass with a polyhydric alcohol.

13. The process described in claim 12 in which the polyhydric alcohol is glycerin.

14. The process described in claim 12 in which the polyhydric alcohol is pentaerythritol.

15. The process described in claim 12 in which the polyhydric alcohol is a polypentaerythritol.

ALFRED E. RHEINECK.
SAMUEL B. CRECELIUS.